US011283620B2

(12) United States Patent
Abbas

(10) Patent No.: US 11,283,620 B2
(45) Date of Patent: Mar. 22, 2022

(54) METHOD, APPARATUS, AND SYSTEM FOR PROVIDING A HOMOMORPHIC CRYPTOSYSTEM

(71) Applicant: HERE GLOBAL B.V., Eindhoven (NL)

(72) Inventor: Ali Abbas, Hanau (DE)

(73) Assignee: HERE Global B.V., Eindhoven (NL)

( * ) Notice: Subject to any disclaimer, the term of this patent is extended or adjusted under 35 U.S.C. 154(b) by 148 days.

(21) Appl. No.: 16/589,986

(22) Filed: Oct. 1, 2019

(65) Prior Publication Data

US 2021/0099308 A1    Apr. 1, 2021

(51) Int. Cl.
*H04L 9/32* (2006.01)
*H04L 9/00* (2022.01)
*G01C 21/30* (2006.01)
*H04L 29/06* (2006.01)
*H04L 67/12* (2022.01)

(52) U.S. Cl.
CPC .......... *H04L 9/3242* (2013.01); *G01C 21/30* (2013.01); *H04L 9/008* (2013.01); *H04L 9/3249* (2013.01); *H04L 63/0428* (2013.01); *H04L 67/12* (2013.01)

(58) Field of Classification Search
CPC ..... H04L 9/3242; H04L 9/3249; H04L 9/008; H04L 63/0428; H04L 67/12; G01C 21/30
See application file for complete search history.

(56) References Cited

U.S. PATENT DOCUMENTS

| | | | | |
|---|---|---|---|---|
| 7,234,058 | B1* | 6/2007 | Baugher | H04L 9/0833 |
| | | | | 380/259 |
| 10,673,862 | B1* | 6/2020 | Threlkeld | H04L 63/08 |
| 2014/0096217 | A1* | 4/2014 | Lehmann | H04L 63/102 |
| | | | | 726/7 |
| 2015/0215123 | A1 | 7/2015 | Kipnis et al. | |
| 2018/0176193 | A1* | 6/2018 | Davis | H04L 63/029 |
| 2018/0267981 | A1 | 9/2018 | Sirdey et al. | |
| 2019/0028279 | A1 | 1/2019 | Tsuda et al. | |
| 2019/0362054 | A1* | 11/2019 | Diehl | H04L 9/088 |

(Continued)

OTHER PUBLICATIONS

Bellafqira et al., "Sharing Data Homomorphically Encrypted with Different Encryption Keys", retrieved on Sep. 24, 2019 from https://arxiv.org/pdf/1706.01756.pdf, Jun. 6, 2017, pp. 1-6.

(Continued)

*Primary Examiner* — Ashokkumar B Patel
*Assistant Examiner* — William B Jones
(74) *Attorney, Agent, or Firm* — Ditthavong, Steiner & Mlotkowski

(57) ABSTRACT

An approach is provided for a homomorphic cryptosystem for use in resource-constrained environments (e.g., vehicle-based use cases) or when computer resources are to be conserved. The approach involves, for example, generating a nonce at a first device (e.g., vehicle engine control unit (ECU)). The approach also involves performing a homomorphic operation on the nonce and a ciphertext to generate a resulting cipher. The ciphertext is provided by a second device (e.g., a data server). The approach further involves attaching the resulting cipher to a request payload (e.g., to request secure data from the data server). The approach further involves transmitting the request payload including the nonce to the second device (e.g., the server).

20 Claims, 11 Drawing Sheets

(56) References Cited

U.S. PATENT DOCUMENTS

2020/0125739 A1* 4/2020 Verma ................ G06N 3/0454
2020/0374100 A1* 11/2020 Georgieva ............ H04L 9/3093

OTHER PUBLICATIONS

Shafagh et al., "Secure Sharing of Partially Homomorphic Encrypted Iot Data", SenSys 2017—15th ACM Conference on Embedded Networked Sensor Systems, Nov. 2017, 15 pages.

* cited by examiner

METHOD, APPARATUS, AND SYSTEM FOR PROVIDING A HOMOMORPHIC CRYPTOSYSTEM

BACKGROUND

Modern services and applications (e.g., assisted or self-driving vehicles) often rely on a cloud-based architecture in which data (e.g., mapping and/or navigation data) are downloaded to a client device (e.g., a processor of the self-driving vehicle) from a server to ensure that the client device receives the most up-to-date data. Because many of these services relate to critical functions (e.g., safe vehicle operation), service providers face significant technical challenges to ensuring that the data transfer process from the server to the client device are performed securely (e.g., free from tampering or hacking) and accurately. In addition, client devices often have limited computational resources (e.g., compute power, memory, bandwidth, etc.), thereby creating additional technical challenges with respect to minimizing resource usage for the client to receive and validate data from the server.

Some Example Embodiments

Therefore, there is a need for an approach for providing a homomorphic cryptosystem that enables efficient and accurate transfer and validation of data between two devices (e.g., between a server and a client device such as but not limited to a processor or engine control unit (ECU) of a vehicle).

According to one embodiment, a method comprises receiving a request to initiate a secret handshake with a device (e.g., a handshake between a server and client device). The method further comprises encrypting a seed using a homomorphic encryption system to generate a ciphertext in response to the request. The method further comprises transmitting the ciphertext to a device (e.g., client device). By way of example, the ciphertext is used in combination with a nonce generated by the device to attach to a request payload from the device.

According to another embodiment, a method comprises generating a nonce at a first device (e.g., a client device). The method further comprises performing a homomorphic operation on the nonce and a ciphertext to generate a resulting ciphertext, wherein the ciphertext is provided by a second device (e.g., a server). The method further comprises attaching the resulting ciphertext to a request payload. The method further comprises transmitting the request payload including the nonce to the second device.

According to another embodiment, a method comprises receiving a request payload from a device (e.g., client device). The request payload includes a request ciphertext, and the request ciphertext is generated by the device by performing a homomorphic operation on a nonce locally stored on the device and a ciphertext transmitted by a server device. The method further comprises extracting the nonce from the request ciphertext using an inverse of the homomorphic operation. The method further comprises attaching the nonce or a derivative of the nonce to a response payload. The method further comprises transmitting the response payload with the attached nonce or the attached derivative to the device.

According to another embodiment, an apparatus (e.g., a server device) comprises at least one processor, and at least one memory including computer program code for one or more computer programs, the at least one memory and the computer program code configured to, with the at least one processor, cause, at least in part, the apparatus to receive a request to initiate a secret handshake with a device (e.g., a handshake between a server and client device). The apparatus is further caused to encrypt a seed using a homomorphic encryption system to generate a ciphertext in response to the request. The method further comprises transmitting the ciphertext to a device (e.g., client device). By way of example, the ciphertext is used in combination with a nonce generated by the device to attach to a request payload from the device.

According to another embodiment, an apparatus (e.g., a client device) comprises at least one processor, and at least one memory including computer program code for one or more computer programs, the at least one memory and the computer program code configured to, with the at least one processor, cause, at least in part, the apparatus to generating a nonce at the apparatus. The apparatus is further caused to perform a homomorphic operation on the nonce and a ciphertext to generate a resulting ciphertext, wherein the ciphertext is provided by another device (e.g., a server). The apparatus is further caused to attach the resulting ciphertext to a request payload. The apparatus is further caused to transmit the request payload including the nonce to the other device (e.g., server).

According to another embodiment, an apparatus (e.g., a server device) comprises at least one processor, and at least one memory including computer program code for one or more computer programs, the at least one memory and the computer program code configured to, with the at least one processor, cause, at least in part, the apparatus to receive a request payload from a device (e.g., client device). The request payload includes a request ciphertext, and the request ciphertext is generated by the device by performing a homomorphic operation on a nonce locally stored on the device and a ciphertext transmitted by a server device. The apparatus is further caused to extract the nonce from the request ciphertext using an inverse of the homomorphic operation. The apparatus is further caused to attach the nonce or a derivative of the nonce to a response payload. The apparatus is further caused to transmit the response payload with the attached nonce or the attached derivative to the device.

According to another embodiment, a non-transitory computer-readable storage medium carries one or more sequences of one or more instructions which, when executed by one or more processors, cause, at least in part, an apparatus to receive a request to initiate a secret handshake with a device (e.g., a handshake between a server and client device). The apparatus is further caused to encrypt a seed using a homomorphic encryption system to generate a ciphertext in response to the request. The method further comprises transmitting the ciphertext to a device (e.g., client device). By way of example, the ciphertext is used in combination with a nonce generated by the device to attach to a request payload from the device.

According to another embodiment, a non-transitory computer-readable storage medium carries one or more sequences of one or more instructions which, when executed by one or more processors, cause, at least in part, an apparatus to generating a nonce at the apparatus. The apparatus is further caused to perform a homomorphic operation on the nonce and a ciphertext to generate a resulting ciphertext, wherein the ciphertext is provided by another device (e.g., a server). The apparatus is further caused to attach the resulting ciphertext to a request payload. The apparatus is further caused to transmit the request payload including the nonce to the other device (e.g., server).

According to another embodiment, a non-transitory computer-readable storage medium carries one or more sequences of one or more instructions which, when executed by one or more processors, cause, at least in part, an apparatus to receive a request payload from a device (e.g., a client device). The request payload includes a request ciphertext, and the request ciphertext is generated by the device by performing a homomorphic operation on a nonce locally stored on the device and a ciphertext transmitted by a server device. The apparatus is further caused to extract the nonce from the request ciphertext using an inverse of the homomorphic operation. The apparatus is further caused to attach the nonce or a derivative of the nonce to a response payload. The apparatus is further caused to transmit the response payload with the attached nonce or the attached derivative to the device.

According to another embodiment, an apparatus (e.g., a service device) comprises means for receiving a request to initiate a secret handshake with a device (e.g., a handshake between a server and client device). The apparatus further comprises means for encrypting a seed using a homomorphic encryption system to generate a ciphertext in response to the request. The method further comprises transmitting the ciphertext to a device (e.g., client device). By way of example, the ciphertext is used in combination with a nonce generated by the device to attach to a request payload from the device.

According to another embodiment, an apparatus (e.g., a client device) comprises generating a nonce at the apparatus. The apparatus further comprises means for performing a homomorphic operation on the nonce and a ciphertext to generate a resulting ciphertext, wherein the ciphertext is provided by another device (e.g., a server). The apparatus further comprises means for attaching the resulting ciphertext to a request payload. The apparatus further comprises means for transmitting the request payload including the nonce to the other device.

According to another embodiment, an apparatus (e.g., a server device) comprises receiving a request payload from a device (e.g., client device). The request payload includes a request ciphertext, and the request ciphertext is generated by the device by performing a homomorphic operation on a nonce locally stored on the device and a ciphertext transmitted by a server device. The apparatus further comprises means for extracting the nonce from the request ciphertext using an inverse of the homomorphic operation. The apparatus further comprises means for attaching the nonce or a derivative of the nonce to a response payload. The apparatus further comprises means for transmitting the response payload with the attached nonce or the attached derivative to the device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a homomorphic cryptosystem are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
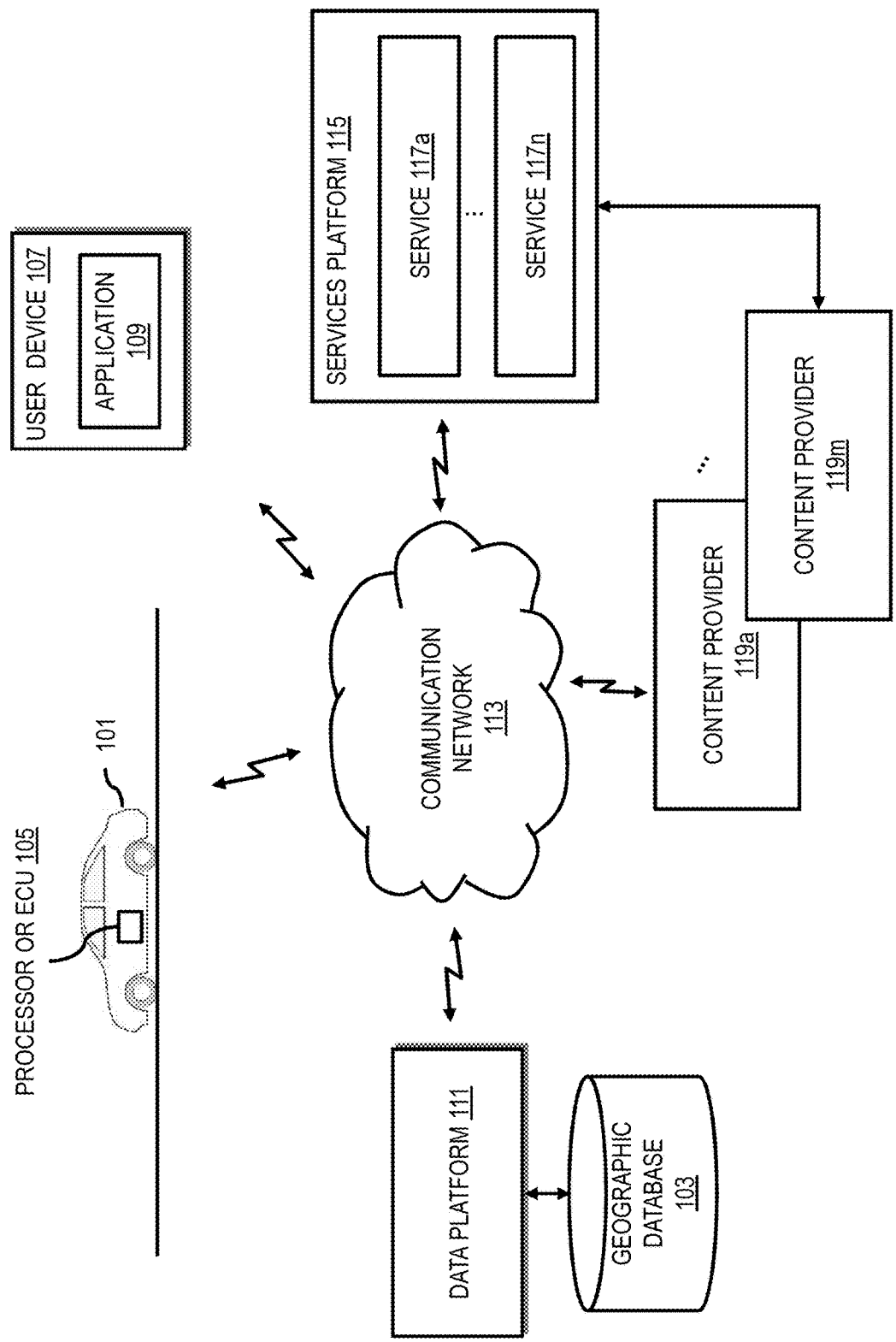
FIG. 1 is a diagram of a system capable of providing a homomorphic cryptosystem, according to one embodiment.

FIG. 1 is a diagram of a system capable of providing a homomorphic cryptosystem, according to one embodiment. By way of example, for cars (e.g., a vehicle 101) to provide assisted or self-driving capabilities, they generally require map localization data and information about their surroundings. This information must be precise to a certain accuracy to support a use case such as autonomous driving. Such map data (e.g., map data as stored in a geographic database 103) is often known as a High Definition (HD) Map that typically have centimeter-level accuracy or better.

As shown in FIG. 1, the processing unit of the vehicle 101 is often known as the engine control unit (ECU) 105 or other equivalent processing unit or processor. In addition or alternatively, the vehicle 101 can be equipped with or otherwise associated with a user device 107 (e.g., personal navigation device, smartphone, etc.) executing an application 109 to request and receive data (e.g., map data) from a data platform 111 according to the various embodiments described herein. As used herein, the ECU or processor 105 and the user device 107 can be referred to as client devices of the data platform 111.

In a use case where the data platform 111 provides a mapping data service, the ECU 105 or client device of the vehicle 101 downloads map data information (e.g., in tile format from the geographic database 103) which contains information such as the attributes of the road, the speed sign limits and other factors needed by the vehicle 101 to provide routing guidance, routing recommendations, self-driving functions, etc. In one embodiment, these map data attributes are sent by a remote server (e.g., the data platform 111) that is run and maintained by the map provider. The map provider will often update the map data of the geographic database 103 to reflect road changes and new attributes. The ECU 105 periodically requests this data to ensure that as data on the provider changes, newer data is used by the ECU 105 to perform its functions.

As previously discussed, because the system 100 depends on transmission of data between two devices (e.g., between the data platform 111 and the ECU 105 or any other client device) over a communication network 113, the system 100 is potentially vulnerable to hacking or tampering. For example, man-in-the-middle attacks such as but not limited to replay attacks be used to compromise the security of data transmissions between the data platform 111 and the ECU 105 by fraudulently intercepting and then repeating or delaying valid data transmissions. Data systems have historically employed tampering countermeasures such as asymmetric cryptography and timestamps to ensure that:

1. The transmitted data payload is unique (against replay attack) by using Time as an attribute; and
2. The transmitted data payload is signed by using a private key to sign the payload by the server (e.g., data platform 111) and a public key on the ECU 105 to validate the signature from the server.

However, the countermeasures described above are still faced with several technical problems with respect to practicality and continued vulnerability to further attacks. For example, because the countermeasures described above use Time as an attribute, the countermeasures require that both the server and the ECU 105 (or any other client device) in the vehicle 101 synchronize accurately with a time server, and require that the time difference between the request and response is not greater than specific time window. These requirements can be hard to achieve when the ECU 105 of the vehicle 101 or other client device is traveling in areas with limited, inconsistent, or no network connectivity (e.g., in areas with poor or no cellular network coverage) over flaky mobile networks. Such poor network coverage areas can be common, particularly in rural geographic areas. Furthermore, the time server used with such countermeasures will be required to scale to potentially large numbers of vehicles 101 or client devices, thereby limiting the scalability of the countermeasure based on the resource capacity (e.g., available network connections, bandwidth, computational resources, memory, etc.) of the time server. In addition, the timer server must be protected against any attacker who might attempt to modify the time clock in order to fool the ECU 105 or other client devices.

Another technical challenge with the countermeasures above is the use of asymmetric encryption (e.g., public-private key encryption) requires considerable processing power on both the data platform 111 and the ECU 105 or other client device. This, in turn, can limit the scalability of the solution as the numbers of client devices (e.g., ECUs 105 of vehicles 101) increase. For example, the data platform 111 or server must have enough resources to encrypt/decrypt payloads sent to and received from potentially thousands or even millions of client devices. From the client device's point of view, a typical ECU 105 generally will have much more limited processing or computing resources. These resources will also be generally allocated or prioritized to more critical functions such as autonomous driving, thereby leaving limited resources available for encryption/decryption of data under asymmetric encryption.

In addition, asymmetric encryption relies on a root of Trust that is based a public key infrastructure backend. The public key infrastructure backend, for instance, maintains the hierarchy and issuance of trust certificates to devices (e.g., servers and/or client devices). For example, in vehicle-based applications, each vehicle 101 may be issued a trust certificate when the vehicle is manufactured. The certificate generally has an expiration period and must be updated periodically. The issuance and maintenance of these certificate can be resource intensive and expensive, thereby further limiting the scalability of the countermeasures described above.

To address these technical problems, the system 100 of FIG. 1 introduces a capability to safely and securely deliver data (e.g., mapping data such as map tiles and attributes stored in the geographic database 103) to client devices (e., the ECU 105 of the vehicle 101 or other user device 107) over the communication network 113 (e.g., mobile or cellular network) such that:
1. What the data platform 111 (e.g., a map provider server) sends is exactly what the client device (e.g., ECU 105, user device 107, etc.) receives and no manipulation of the data payload by an attacker can go unnoticed.
2. That any data previously delivered data payload which is valid, if replayed by an attacker to fool the ECU will be flagged and prevented.

In other words, embodiments of the system 100 introduce a layer of security to ensure that the client devices (e.g., processor or ECU 105 of the vehicle 101) can safely reject data that are simply old replay data or data that have been maliciously modified using a reduced amount of computational resources compared to a traditional asymmetric encryption system. In one embodiment, the system 100 uses the concept of homomorphic encryption to provide a secure way for client devices (e.g., the ECU 105) to validate that a response from the server (e.g., the data platform 111) is both unique and secure. Homomorphic encryption, for instance, refers to a cryptosystem that enables an operation (e.g., a computation such as addition, subtraction, multiplication, etc.) to be performed on a ciphertext to generate an encrypted result that when decrypted would give the same result as performing the same operation on the plaintext or cleartext version of the cipher.

This advantageously enables the ECU 105 or client device to avoid performing resource-intensive operations (e.g., asymmetric decryption of data) by instead performing a simple gate operation (e.g., addition, multiplication, etc.) on an existing encrypted cipher without having to know the encryption keys used to encrypt the cipher. Moreover, because no decryption of the cipher is performed on the client device (e.g., the ECU 105 and/or user device 107), the system 100 does not rely on a public key infrastructure nor a root of trust, thereby further reducing the resources needed to maintain such a public key infrastructure.

In one embodiment, the system 100 enables client devices (e.g., the ECU 105) to issue a unique random nonce which can then be passed securely to the server (e.g., data platform 111) to create a homomorphic cryptographic digest which can then be used by the ECU 105 to confirm uniqueness and integrity of the response payload from the data platform 111. Because the asymmetric cryptographic operations are generally performed on the server side, the embodiments of the homomorphic cryptosystem provide for several technical advantages including but not limited to:
1. The system 100 does not require the ECU 105 or other client device to be locked with a specific cryptographic version because the asymmetric cryptographic operations are performed on the server side.
2. The system 100 does not require the ECU 105 or other client device to perform resource-intensive computations to validate the payload received from the data platform 111.
3. There is no tight coupling of cryptographic standards between the ECU 105 or other client devices and the Cloud Infrastructure (e.g., the data platform 111).
4. There is no need for synchronization between the ECU 105 or other client devices and the Cloud Infrastructure (e.g., the data platform 111).
5. Every ECU 105 or client device can be issued a unique cipher by the server (e.g., the data platform 111), thereby improving security diversification.
6. The system 100 does not rely on an external infrastructure like a public key infrastructure (PKI).
7. The system 100 does not rely on external tracking infrastructure like a time server for establishing uniqueness of a server response.

Figure 2:
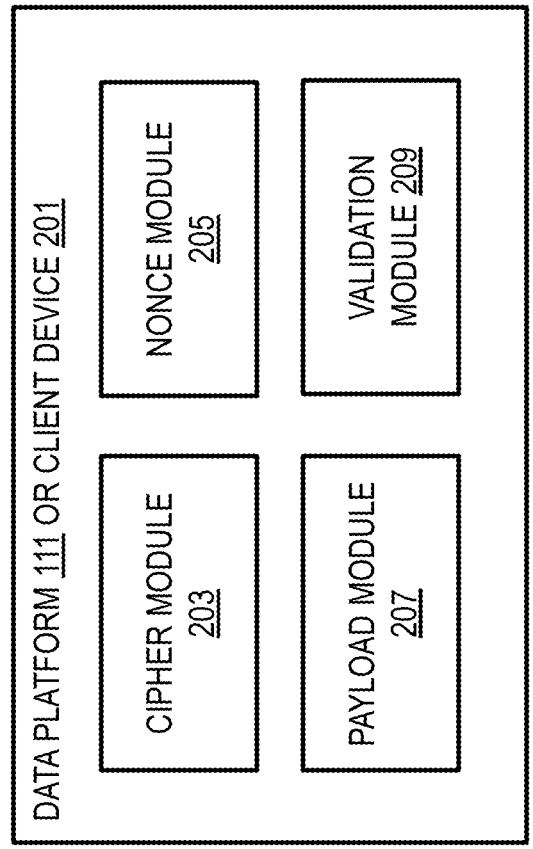
FIG. 2 is a diagram of components of a data platform (e.g., a server) or client device (e.g., in-vehicle processor or engine control unit (ECU)) capable of providing a homomorphic cryptosystem, according to one embodiment.

FIG. 2 is a diagram of components of a data platform 111 (e.g., a server) or client device 201 (e.g., in-vehicle processor/ECU 105 or user device 107) capable of providing a homomorphic cryptosystem, according to one embodiment. The data platform 111 and client device 201 can work alone or in combination to provide a homomorphic cryptosystem. In one embodiment, the data platform 111 and/or client device 201 can include one or more components. As shown in FIG. 2, the components include a cipher module 203, a nonce module 205, a payload module 207, and a validation module 209. It is contemplated that the functions of these components may be combined or performed by other components of equivalent functionality. Moreover, it is contemplated that the data platform 111 or the client device 201 need not include all of the modules 203-209. The above presented modules and components of the data platform 111 or client device 201 can be implemented in hardware, firmware, software, or a combination thereof. In another embodiment, the data platform 111, client device 201, and/or one or more of their modules 203-209 may be implemented as a cloud-based service, local service, native application, or combination thereof. The functions of the data platform 111, client device 201, and their modules 203-209 are discussed with respect to FIGS. 3-7 below.

Figure 3:
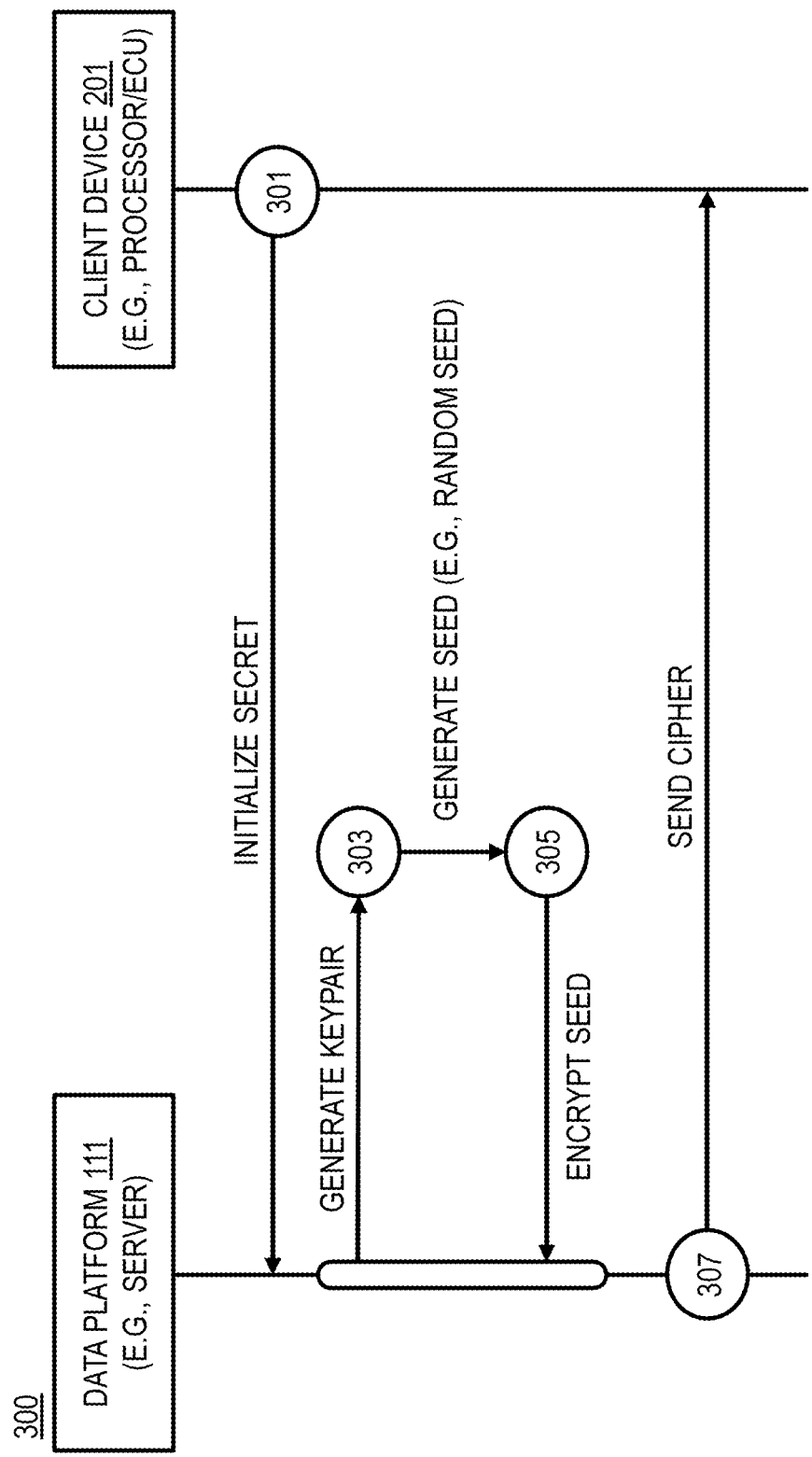
FIG. 3 is a sequence diagram of a process for initializing a homomorphic cryptosystem, according to one embodiment, according to one embodiment.
Figure 9:
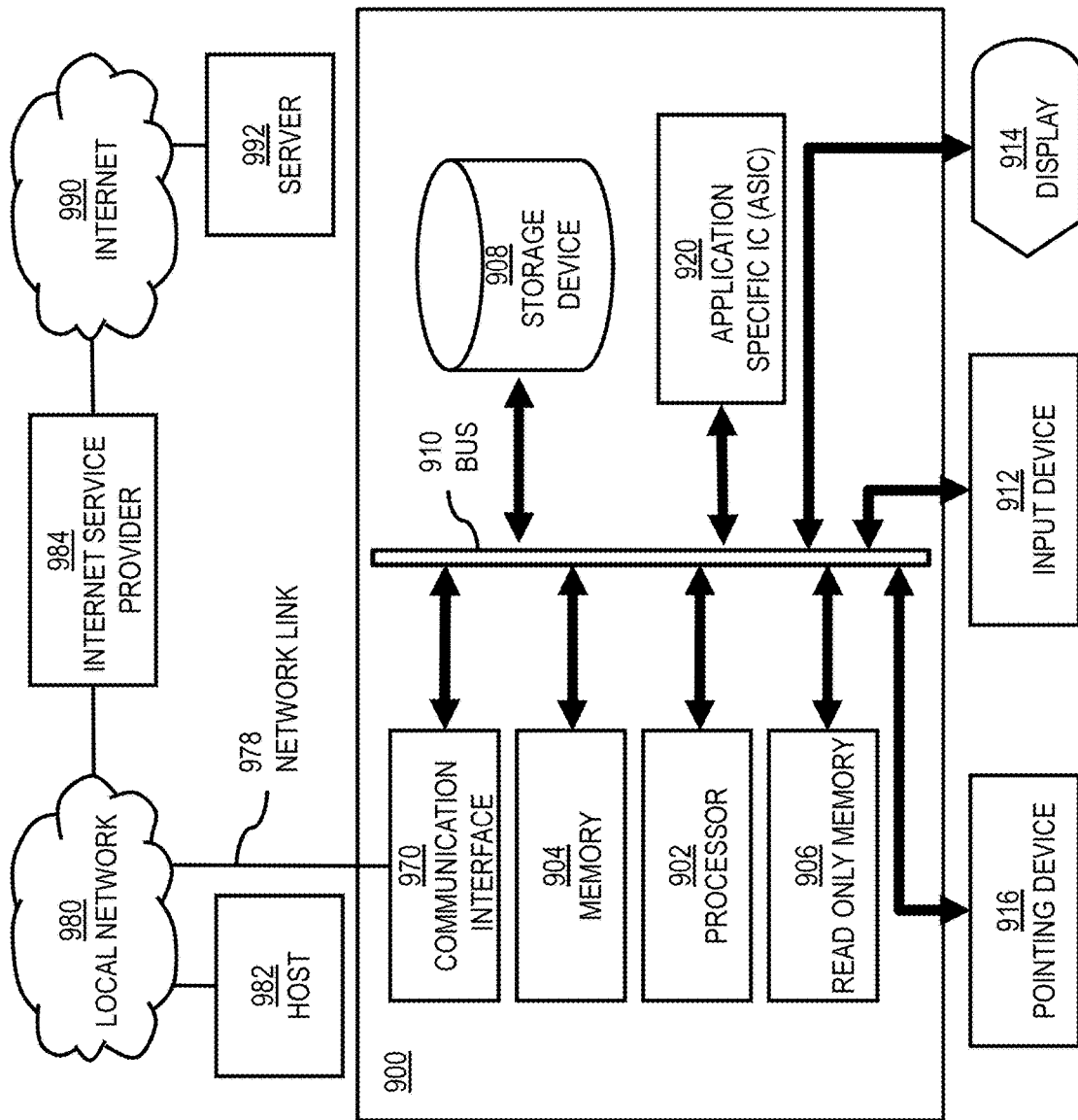
FIG. 9 is a diagram of hardware that can be used to implement an embodiment.
Figure 10:
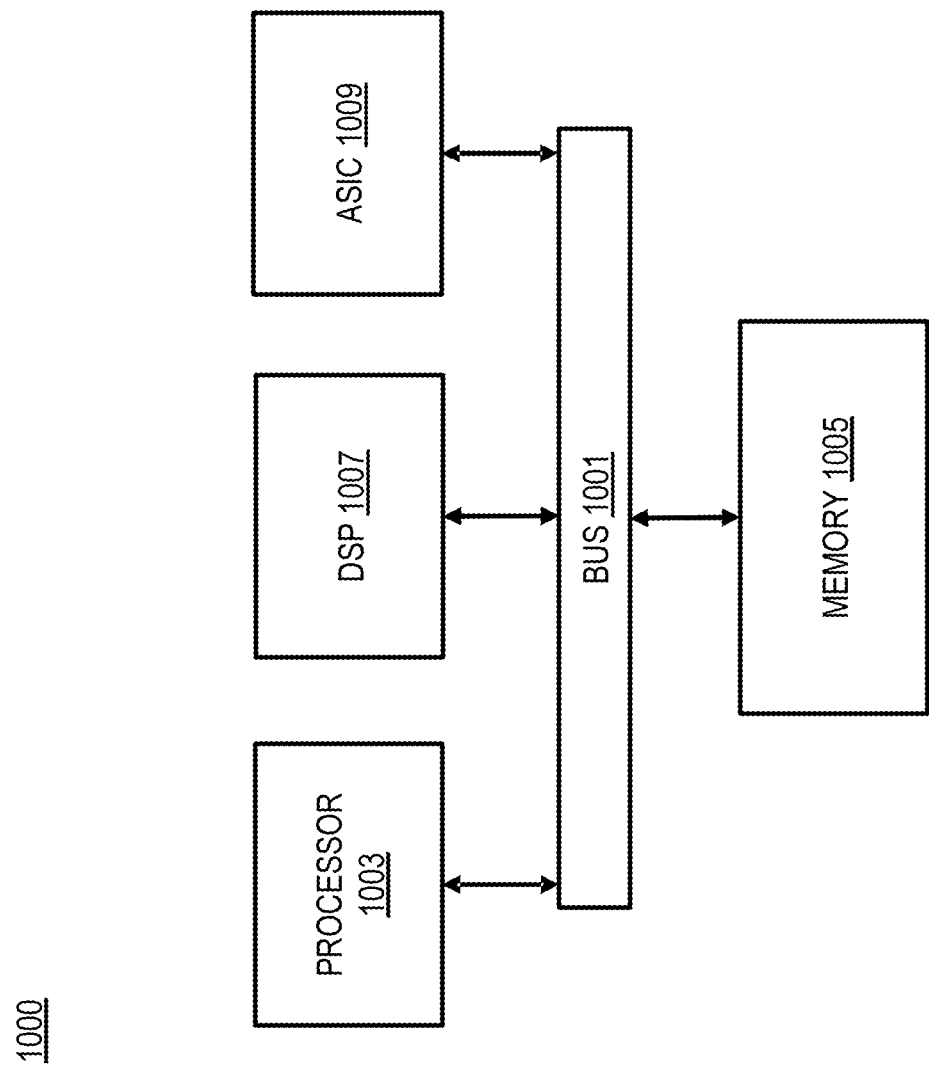
FIG. 10 is a diagram of a chip set that can be used to implement an embodiment.

FIG. 3 is a sequence diagram of a process for initializing a homomorphic cryptosystem, according to one embodiment. In various embodiments, the data platform 111 and/or any of its modules 203-209 may perform one or more portions of the process 300 and may be implemented in, for instance, hardware as shown in FIG. 9 and/or a chip set including a processor and a memory as shown in FIG. 10. As such, the data platform 111 and/or the modules 203-209 can provide means for accomplishing various parts of the process 300, as well as means for accomplishing embodiments of other processes described herein. In addition or alternatively, the services platform 115, one or more of the services 117a-117n (also collectively referred to as services 117) of the services platform 115, and/or one or more content providers 119a-119m (also collectively referred to as content providers 119) may perform any combination of the steps of the process 300 in combination with the data platform 111, or as standalone components. Although the process 300 is illustrated and described as a sequence of steps, its contemplated that various embodiments of the process 300 may be performed in any order or combination and need not include all of the illustrated steps.

In one embodiment, the process 300 is performed to initialize the homomorphic cryptosystem of the system 100 to enable secure data transmissions between the data platform 111 (e.g., a server) and a client device 201 (e.g., an ECU 105). The embodiments of the process 300 are described with respect to the data platform 111 being operated by a map provider to transmit map data (e.g., as stored in the geographic database 103) from the data platform 111 to an ECU 105 of a vehicle 101 (e.g., the client device 201) to support navigation, mapping, self-driving, assisted driving, etc. functions by the ECU 105 and/or vehicle 101. However, it is contemplated that the embodiments are also applicable to any data transfer use case between any two devices under any computation architecture including but not limited to a client-server architecture, peer-to-peer architecture, and/or the like.

To begin the initialization process, at step 301, the cipher module 203 of the data platform 111 receives a request from the client device 201 (e.g., the ECU 105) to initiate a secret handshake between the data platform 111 and the ECU 105. Unlike traditional cryptographic implementations, the ECU 105 does not have a static key or secret. Instead, during the secret initialization handshake, the ECU 105 sends a GET call (or equivalent request message) to the data platform 111 to indicate a secret handshake. In one embodiment, it is noted that this GET call does not contain any secrets nor body request.

At step 303, upon receiving the request, the cipher module 203 initializes a random key pair to satisfy a homomorphic property. The keypair is used as part of a key-based encryption system for encrypting a seed as part of the initialization process. As noted above, a cryptosystem is homomorphic if an operation or computation performed on a ciphertext (e.g., an encrypted message) would give an encrypted result that is the same result as performing the same operation or computation on the unencrypted messaged once the encrypted result is decrypted. In this way, a homomorphic cryptosystem enables encrypted data to be operated on by an entity that does not have the keys to decrypt the encrypted data. This enables encrypted data to be processed by external entities (e.g., external to the entities authorized to encrypt/decrypt data or in possession of corresponding public/private keys) while maintaining the privacy of the underlying data.

In one embodiment, the cipher module 203 can use unpadded Rivest-Shamir-Adleman (RSA) encryption or equivalent as a base homomorphic cryptosystem. Other examples of a homomorphic cryptosystem include but are not limited to ElGamal, Goldwasser-Micali, Benaloh, and Paillier. By way of example, an unpadded RSA is an asymmetric encryption system in which the RSA public key can have a modulus n and encryption component e. The encryption of a message X is then represented by $\varepsilon(X)=X^e$ mod n. The resulting homomorphic property is:

$$\varepsilon(X_1)\cdot\varepsilon(X_2)=X_1^e X_2^e \bmod n = (X_1 X_2)^e \bmod n = \varepsilon(X_1 \cdot X_2)$$

Table 1 below illustrates example pseudocode for generating the public key (pubkey) and private key (privkey)-used for an asymmetric homomorphic cryptosystem.

TABLE 1 pubkey, privkey = generate.keypair( )
1. Choose 2 large prime numbers p, q such as GreatestCommonDivisor(pq, (p−1)(q−1)) = 1
2. Compute n = pq and LeastCommonMultiple(p−1, q−1)
3. Select a random integer g
4. Ensure n divides the order of g
5. pubkey = (n, g)
6. privkey = (LeastCommonMultiple, ModularMultiplicativeInverse)

In one embodiment, after generating the keys, the cipher module 203 stores both the private and public key at the data platform 111 and does not share or expose the keys (public or private keys) with the client device 201.

At step 305, the cipher module 203 then initializes a seed (s). The seed, for instance, can be a random seed or any other seed selected or used by the data platform 111. The cipher module 203 encrypts the seed (s) using the public key generated above. In other words, the cipher module 203 uses the seed (s) and public key as input parameters into a public key encryption function (E) to generate a ciphertext (cipher_c) such that cipher_c=E(public key, s). In other words, the encrypting of the of the seed can be performed using a key-based encryption system. Table 2 below illustrates example pseudocode for encrypting the seed (s) where: r (e.g., public key) is a prime number between a range that is greater than 0 and less than a maximum number n; m (e.g., private key) is prime number between a range that is equal to or greater than 0 and less than n; and g is the random seed s.

TABLE 2 s = random( )
cipher_c = pubkey.encrypt(s)
1. 0 < r < n
2. 0 <= m < n
3. c = g^m * r^n mod n^2

In summary, the cipher module 203 encrypts a seed using a homomorphic encryption system to generate a ciphertext (e.g., cipher_c). At step 307, the cipher module 203 then sends the ciphertext back to the ECU 105 or client device 201. In one embodiment, the cipher module 203 can generate a unique ciphertext for each client device 201, e.g., by using a different seed and/or keypair for each client device 201. It is noted that only the ciphertext and not any of the keys (e.g., public or private keys) used to generate the ciphertext are sent to the client device 201. Thus, no key of the key-based encryption system used to encrypt the seed is transmitted to the client device 201. In one embodiment, the ECU 105 or client device 201 stores the ciphertext (cipher_c) locally for later use such as making data requests as described below with respect to FIG. 4.

Figure 4:
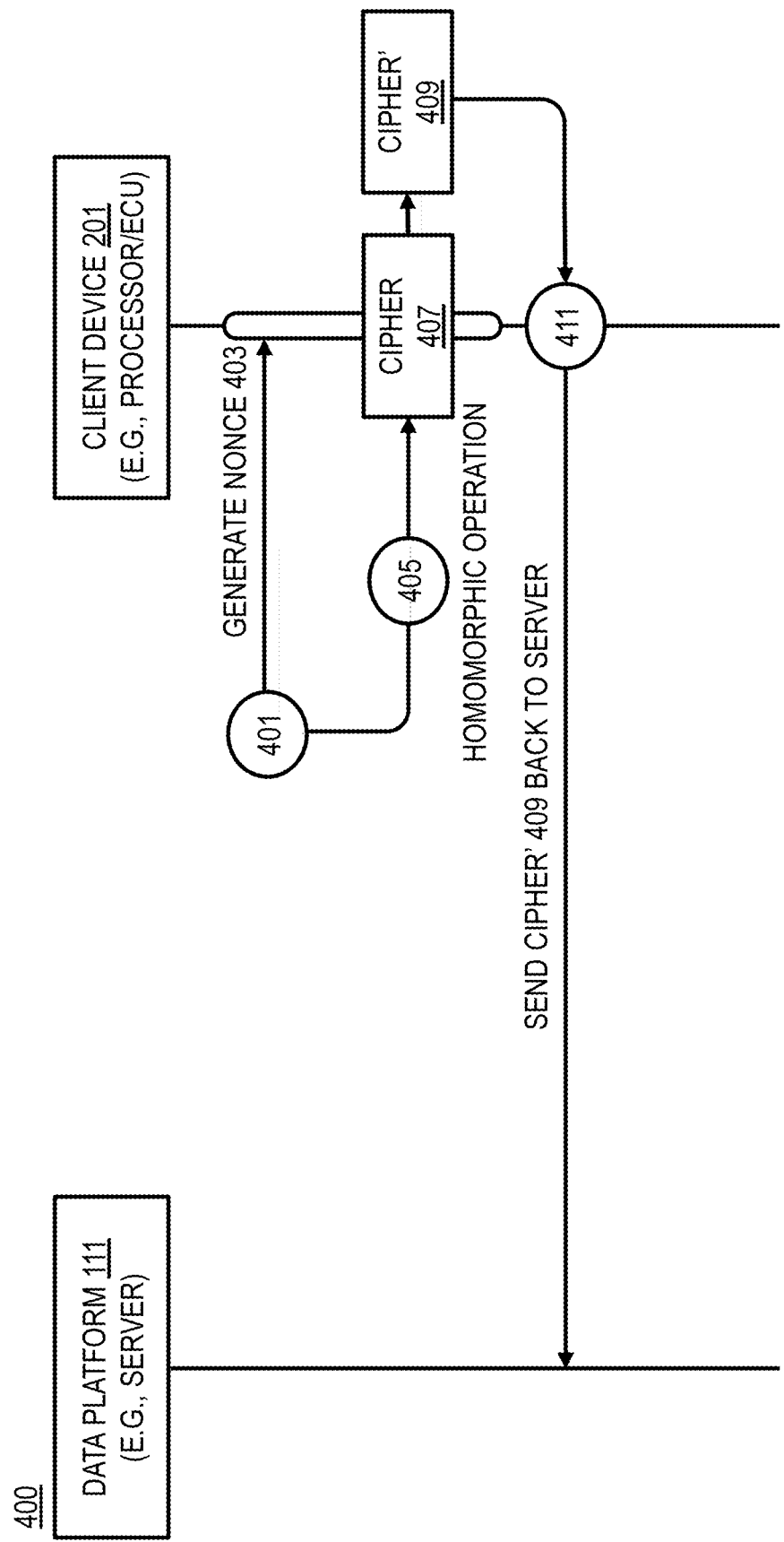
FIG. 4 is a sequence diagram of a process for generating a request payload using a homomorphic cryptosystem, according to one embodiment.
Figure 11:
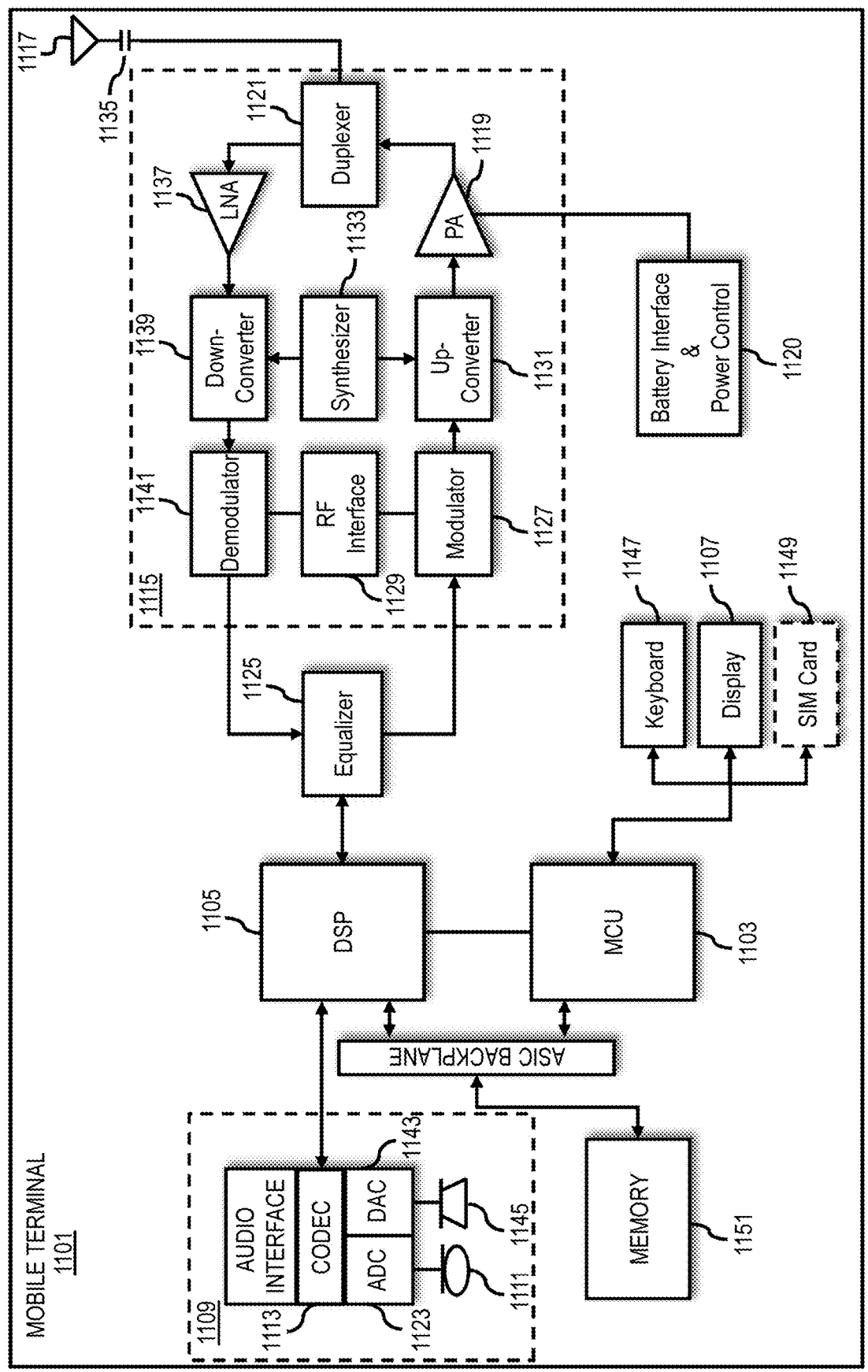
FIG. 11 is a diagram of a mobile terminal (e.g., handset or other mobile device, like a vehicle or part thereof) that can be used to implement an embodiment.

FIG. 4 is a sequence diagram of a process for generating a request payload using a homomorphic cryptosystem, according to one embodiment. In various embodiments, the client device 201 and/or any of its modules 203-209 may perform one or more portions of the process 400 and may be implemented in, for instance, a client terminal as shown in FIG. 11 and/or a chip set including a processor and a memory as shown in FIG. 10. As such, the client device 201 and/or the modules 203-209 can provide means for accomplishing various parts of the process 400, as well as means for accomplishing embodiments of other processes described herein. In addition or alternatively, the services platform 115, one or more of the services 117, and/or one or more content providers 119 may perform any combination of the steps of the process 400 in combination with the client device 201, or as standalone components. For example, the services platform 115, services 117, and/or content providers 119 can either be a server or client of each other or of the data platform 111/client device 201. Although the process 400 is illustrated and described as a sequence of steps, its contemplated that various embodiments of the process 400 may be performed in any order or combination and need not include all of the illustrated steps.

In one embodiment, the process 400 can be performed by the client device 201 after receiving a ciphertext from the data platform 111 generated, e.g., according to the process 300 of FIG. 3. For example, prior to the process 400, the data platform 111 can generate and transmit a cipher to the client device 201 based on an initial handshake process. Then, for any new request (e.g., request for data such as map tile data)

made from the client device 201 (e.g., the ECU 105) to the data platform 111 (e.g., a server), the client device 201 can perform the process 400 to generate a request data payload.

At step 401, the nonce module 205 of the client device 201 generates a nonce 403 (e.g., a cryptographic nonce). In one embodiment, the cryptographic nonce 403 can be any arbitrary number such as a random or pseudo-random number. In addition, the nonce module 205 may set additional rules or parameters on the nonce 403 such as but not limited to restricting the nonce 403 to a one-time use or other limited use.

At step 405, after generating the nonce 403, the nonce module 203 can perform a homomorphic operation (e.g., addition, multiplication, or any gate operation) on the nonce 403 and the cipher 407 (e.g., ciphertext received from the data platform 111 according to the process 300 of FIG. 3 and stored locally at the client device 201). As described above, the homomorphic operation can be any operation or computation that satisfies the homomorphic property for a given homomorphic base system (e.g., unpadded RSA or equivalent). For example, the nonce module 205 of the client device 201 (e.g., the ECU 105 or user device 107) performs a homomorphic operation (e.g., an addition, multiplication, etc.) of the nonce 403 and the stored cipher 407 (cipher_c) to generate a resulting cipher' 409 (cipher_c1) as illustrated below:

$$\text{homomorhpic operation}(nonce, cipher\_c) \rightarrow nonce \times cipher\_c \rightarrow cipher\_c1$$

In one embodiment, the homomorphic operation can be selected as a computationally simple calculation (e.g., multiplication) that minimizes the computational load on the client device 201.

At step 411, the payload module 207 attaches the resulting cipher' 409 (e.g., cipher_c1) to a request payload. For example, the request payload can be any request message that specifies the parameters for requesting data (e.g., map data) from the data platform 111. The cipher' 409 can then be appended to the request message to generate the final request payload for transmission. It is contemplated that the payload module 207 can use any format or protocol for attaching the resulting cipher' 409 to the request payload. Although the embodiments of the process 400 are described with respect to transmitting the resulting cipher' 409 attached to a request payload, it is contemplated that in some embodiments, the payload module 207 can transmit the resulting cipher' 409 independently of any payload.

Figure 5:
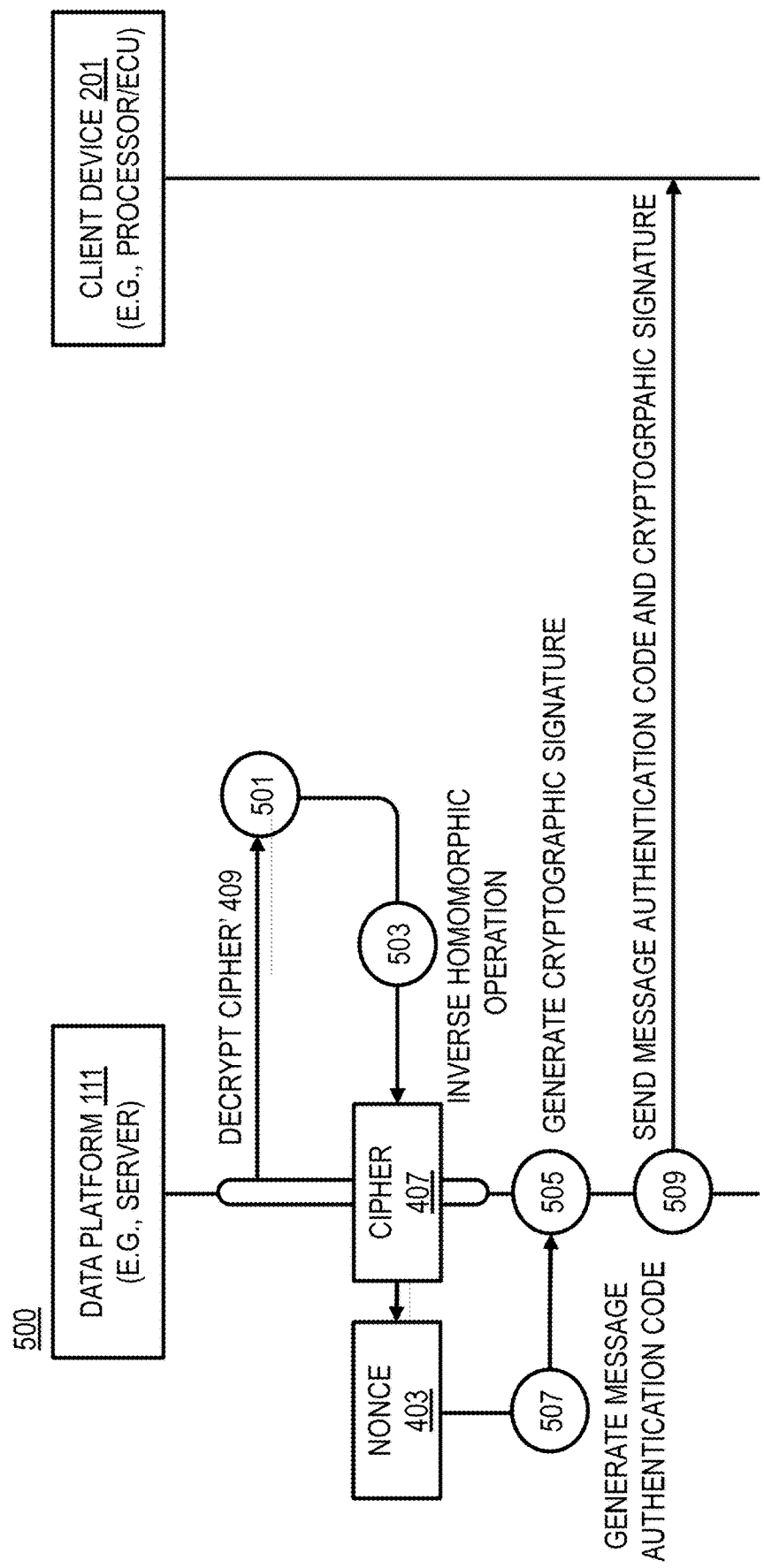
FIG. 5 is a sequence diagram of a process for generating a response payload using a homomorphic cryptosystem, according to one embodiment.

In one embodiment, the transmitted resulting cipher' 409 can be used by the data platform 111 according to, for instance, the process 500 of FIG. 5. FIG. 5 is a sequence diagram of a process for generating a response payload using a homomorphic cryptosystem, according to one embodiment. In various embodiments, the data platform 111 and/or any of its modules 203-209 may perform one or more portions of the process 500 and may be implemented in, for instance, hardware as shown in FIG. 9 and/or a chip set including a processor and a memory as shown in FIG. 10. As such, the data platform 111 and/or the modules 203-209 can provide means for accomplishing various parts of the process 500, as well as means for accomplishing embodiments of other processes described herein. In addition or alternatively, the services platform 115, one or more of the services 117a-117n (also collectively referred to as services 117) of the services platform 115, and/or one or more content providers 119a-119m (also collectively referred to as content providers 119) may perform any combination of the steps of the process 500 in combination with the data platform 111, or as standalone components. Although the process 500 is illustrated and described as a sequence of steps, its contemplated that various embodiments of the process 500 may be performed in any order or combination and need not include all of the illustrated steps.

In one embodiment, the process 500 can be performed after the resulting cipher 407 is generated by the client device 201 and transmitted to the data platform 111 (e.g., as part of a payload request). However, it is contemplated that the resulting cipher 407 (e.g., cipher in which a nonce generated by client device 201 is encoded) can also be transmitted alone or in a combination with any other communication from the client device 201 to the data platform 111 (e.g., any communication other than a data payload request).

Accordingly, the payload module 207 of the data platform 111 receives a request payload (or other equivalent communication) from a device (e.g., the client device). In one embodiment, the request payload includes a request ciphertext (e.g., the resulting cipher' 409) that is generated by the client device 2091 by performing a homomorphic operation on a nonce locally stored on the client device 201 and a ciphertext (e.g., cipher 407) transmitted to the client device 201 by the data platform 111 (e.g., according to the embodiments of the secret handshake process 300 of FIG. 3). It is noted that in one embodiment, the client device 201 does not transmit or share the nonce itself with the data platform 111, and instead shares on the resulting cipher 407 that is based on the nonce.

At process 501, the cipher module 203 of the data platform 111 performs, for instance a decrypt operation (or other equivalent nonce extraction operation) using the private key (e.g., privkey) previously generated and stored on the data platform 111 (e.g., according to the embodiments of the secret handshake process 300 of FIG. 3). For example, the cipher module 203 can decrypt the resulting cipher' 409 to generate a decrypted cipher' 409 (e.g., cipher_c1_decrypt) as represented as follows:

$$\text{decrypt}(cipher_{c1}, privkey) \rightarrow cipher\_c1\_decrypt$$

It is noted that in one embodiment, the decrypt operation is performed only on the data platform 111 (e.g., server side) and not on the client device 201, thereby advantageously minimizing the use of computational resources on the client device 201 (e.g., an ECU 105 that may have limited computational resources or computational resources that are dedicated to other critical functions such as autonomous driving or self-driving of the vehicle 101).

At process 503, the nonce module 205 extracts the nonce 403 from the request ciphertext (e.g., cipher_c1_decrypt) using an inverse of the homomorphic operation performed by the client device 201 to generate the resulting cipher' 409 (e.g., according to the embodiments of the process 400 of FIG. 4). In other words, the nonce module 305 recovers the nonce 403 and cipher 407 (e.g., cipher_c) from the resulting cipher' 409 included in the request payload as follows:

$$\text{inverse homomorphic operation}(cipher\_c1\_decrypt) \rightarrow cipher\_c \text{ and } nonce$$

In one embodiment, the homomorphic operation and its inverse can be pre-configured as a system parameter on both the data platform 111 and client device 201 (e.g., the ECU 105). For example, the system 100 can be configured to use a single homomorphic operation or rotate through a set of homomorphic operations (e.g., based on time, activity, use, etc.). In one embodiment, the homomorphic operation can be configured individually for each client device 201 (e.g., using a different homomorphic operation for each client device 201). In this case, the homomorphic operation can be specified during the initial handshake process (e.g., process 300 of FIG. 3) or other equivalent process. In yet another embodiment, the client device 201 can send a message to the data platform 111 indicating the homomorphic operation used to generate the resulting cipher' 409 as part of the process 400 or any time before sending a request payload to the data platform 111.

In one embodiment, the payload module 207 can attaching the nonce 403 or a derivative of the nonce 403 to a response payload for transmission back to the client device 201. In use cases where higher security is desired (e.g., in autonomous driving use cases), the derivative of the nonce 403 can used to protect the nonce 403 from interception or exposure during a return transmission to the client device 201.

In one embodiment, the cipher module 203 of the data platform 111 can generate the derivative of the nonce 403 as a message authentication code (MAC), cryptographic signature (e.g., SHA256 or equivalent), hash digest, or a combination thereof. For example, at process 505, the cipher module 203 can generate a cryptographic signature of the response payload using a secure hash function (e.g., SHA256 or equivalent). The response payload can be any data that is responsive to the request payload sent by the client device 201. In a map data use case, the client device 201 (e.g., an ECU 105) can send a request for updated map data for a given geographic area. The response payload to this request would then be map tile data for the given geographic area. The cryptographic signature for the map tile data can then be generated. For example, a SHA256-based cryptographic signature is a 64-digit hexadecimal number calculated from the individual data values of the map tile data. The SHA256 signature (or any other cryptographic signature) is highly unlikely to be discovered at random. In other words, it is unlikely that two different map tiles will have the exact same signature, or a map tile whose data has been changed after generating the cryptographic signature will still have the same signature.

At process 507, the cipher module 203 can then generate a message authentication code based at least in part on the nonce and/or the cryptographic signature of the response payload. For example, the message authentication code (MAC) can be a hash-based message authentication code (e.g., HMAC) generated using a cryptographic hash function (e.g., SHA256) and a secret key. In one embodiment, the HMAC is generated using the SHA256 or other cryptographic signature of the response payload and then using the nonce 403 (e.g., extracted from the request payload transmitted from the client device 201) as the secret key. This HMAC operation is illustrated as follows:

MAC=HMAC(nonce,SHA256_signature(response payload))

The nonce 403 or the derivative of the nonce 403 (e.g., the cryptographic signature, message authentication code, hash, etc.) can then be attached to a response payload or other communication to be transmitted to client device 201. For example, at process 509, the payload module 207 can adds the MAC (e.g., HMAC DIGEST generated from the cryptographic signature and nonce 403) and the cryptographic signature (e.g., SHA256 signature) in clear or plain text to the response payload. In other words, the response payload includes both the HMAC digest in which the cryptographic signature (e.g., SHA256 signature of the response payload) is incorporated as well as another version of the cryptographic signature against which the version in the HMAC digest (e.g., MAC) can be compared for validation (e.g., validation according to the embodiments described with respect to FIG. 6 below). The payload module 207 can then transmit the response payload with the attached nonce 403 or the attached derivative of the nonce 403 to the client device 201.

Figure 6:
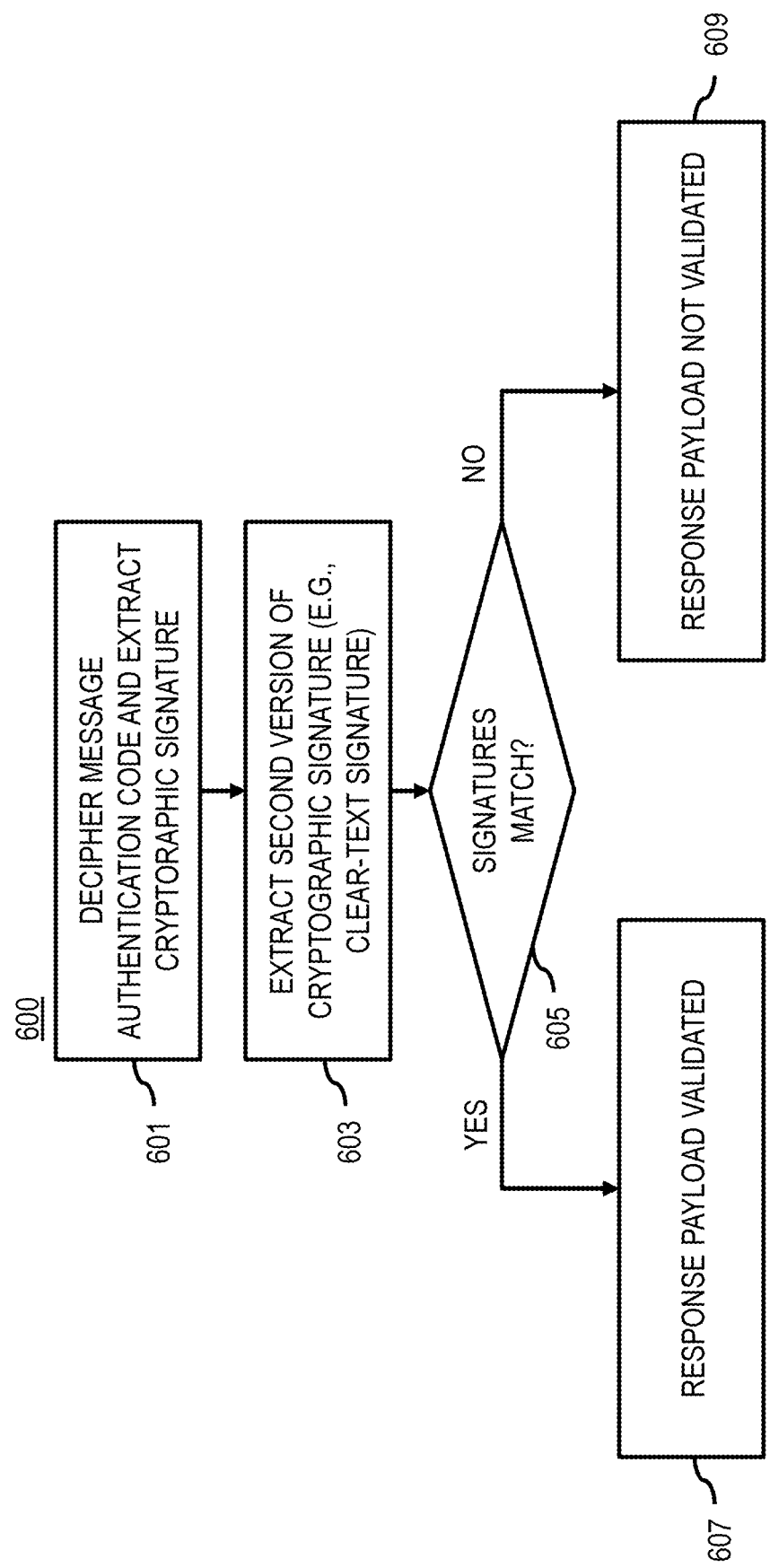
FIG. 6 is a flowchart of a process for validating a response payload using a homomorphic cryptosystem, according to one embodiment.

FIG. 6 is a flowchart of a process for validating a response payload using a homomorphic cryptosystem, according to one embodiment. In various embodiments, the client device 201 and/or any of its modules 203-209 may perform one or more portions of the process 600 and may be implemented in, for instance, a client terminal as shown in FIG. 11 and/or a chip set including a processor and a memory as shown in FIG. 10. As such, the client device 201 and/or the modules 203-209 can provide means for accomplishing various parts of the process 600, as well as means for accomplishing embodiments of other processes described herein. In addition or alternatively, the services platform 115, one or more of the services 117, and/or one or more content providers 119 may perform any combination of the steps of the process 600 in combination with the client device 201, or as stand-alone components. For example, the services platform 115, services 117, and/or content providers 119 can either be a server or client of each other or of the data platform 111/client device 201. Although the process 600 is illustrated and described as a sequence of steps, its contemplated that various embodiments of the process 600 may be performed in any order or combination and need not include all of the illustrated steps.

In one embodiment, once the client device 201 (e.g., the ECU 105) receives a response payload from the data platform 111 that has been generated according to the process 500 of FIG. 5, the validation module 209 of the client device 201 can validate the data in the response payload using the process 600. At process 601, the validation module 209 of the client device 201 retrieves the nonce 403 from local memory at the client device 201 that the client device 201 initially generated. The validation module 209 then uses the local copy of the nonce 403 (e.g., local to the client device 201) to decipher the MAC (e.g., HMAC Digest) attached to the response payload to extract the cryptographic signature of the response payload from the HMAC or cryptographic digest. For example, the validation module 209 uses the local nonce 403 as a key to decipher the cryptographic signature (e.g., the SHA256_SIGNATURE) of the response payload from the HMAC Digest as follows:

SHA256_SIGNATURE=HMAC_DECRYPT (NONCE,HMAC Digest)

At process 603, the validation module 209 also extracts a second version of the cryptographic signature (e.g., a clear-text version, SHA256_SIGNATURE_CLEARTEXT, or other included version) from the response payload. For example, if the second version is included as clear-text in the response payload, the validation module 209 can simply parse the clear-text cryptographic signature from the response payload. If the data platform 111 used other means to encode the second version, the validation module 209 can use the corresponding decoding means to decode the second version of the cryptographic signature from the response payload.

At process 605, the validation module 209 compares both cryptographic or hash signatures (e.g., a first signature deciphered from the HMAC digest, and a second signature extracted from the response payload) for equality. At process 607, if the two signatures match, the validation module 209 determines that the response payload is validated. For example, the validation module 209 can be configured to determine that no tampering of the response payload too place and the response payload is unique since the nonce 403 is unique. At process 609, if the two signatures do not match, the validation module 209 can determine that the response payload is not validated. On no match, the validation module 209 can also be configured to determine implications such as but not limited to:

1. The response payload is replay attack and should be rejected or not used; and
2. The response payload has been tampered with and should be rejected or not used.

Figure 7:
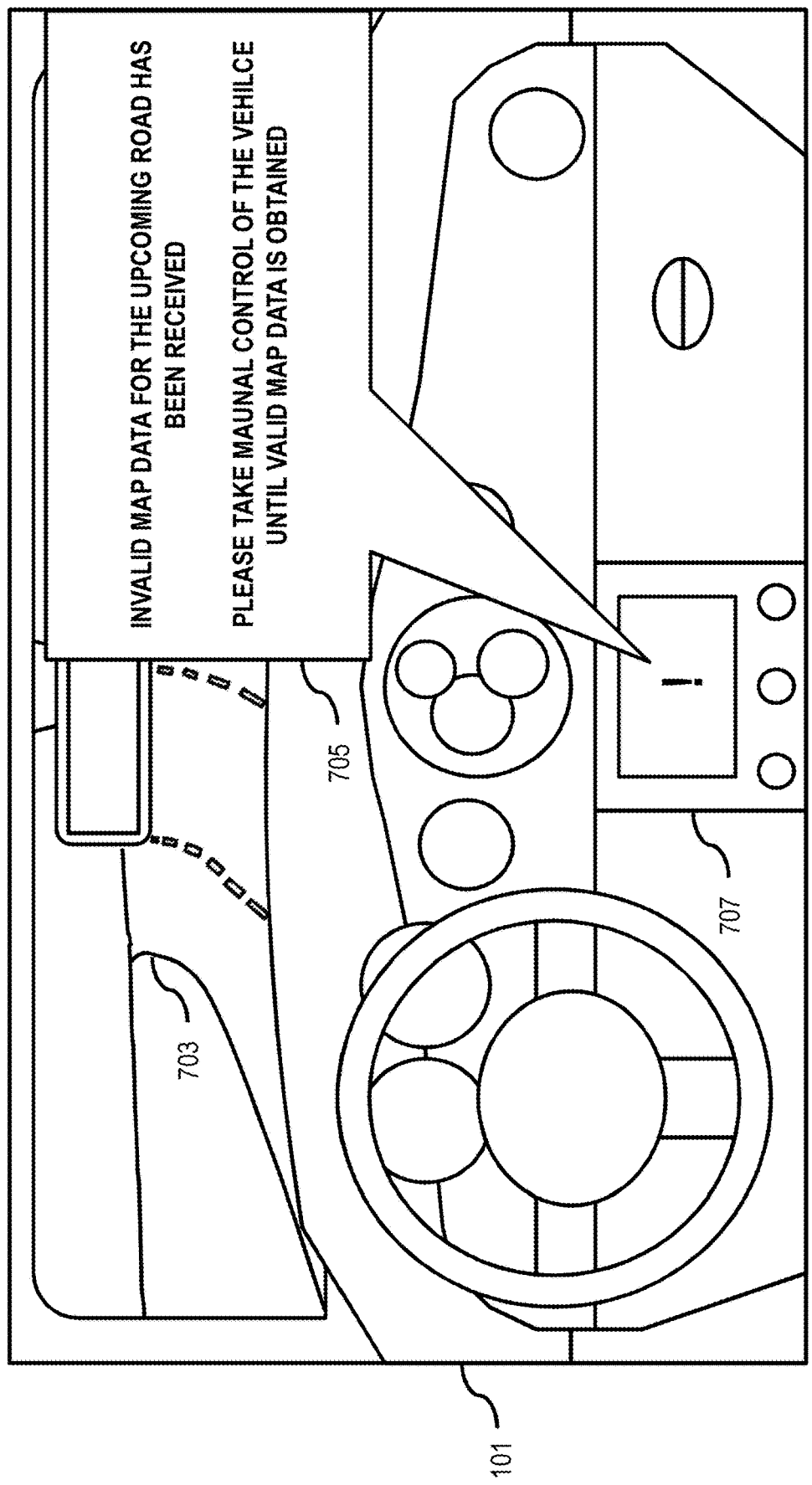
FIG. 7 is a diagram illustrating an example use case of validating map data using a homomorphic cryptosystem, according to one embodiment.

FIG. 7 is a diagram illustrating an example use case of validating map data using a homomorphic cryptosystem, according to one embodiment. In the example of FIG. 7, the vehicle 101 is operating in self-driving mode and approaches a road 703 for which it is requesting update map data from a data platform 111 operated by a map service provider. The vehicle 101 is equipped with an ECU 105 that transmits a map data request to the data platform 111 according to the embodiments of the homomorphic cryptosystem described herein. For example, the data platform 111 and ECU 105 have previously initiated a handshake that resulted in the data platform 111 transmitting a cipher for storage in a local memory of the ECU 105. The data platform 111 generated the cipher based on a random seed using a cryptosystem that is homomorphic (e.g., unpadded RSA). The cipher is transmitted to the ECU 105 but not the encryption keys used to encrypt the cipher.

To make the map data request for the road 703, the ECU 105 generates a nonce and then performs a homomorphic gate operation (e.g., multiplication, addition, etc.) on the cipher received from the data platform 111 and the nonce to generate a request cipher. The ECU 105 attaches the request cipher to the map data request payload and transmits the request payload to the data platform 111. On receiving, the data request, the data platform 111 deciphers the request cipher from the request payload and extracts the nonce from the request cipher using a reverse of the homomorphic operation used by the ECU 105 to generate request cipher. The data platform 111 generates a response payload including the request map tile data, and generates a SHA signature of the response payload. The data platform 111 also generates an HMAC digest of the SHA signature using the nonce as a key, and attaches the HMAC digest to the response data payload for transmission to the ECU 105.

In this example, an attacker then intercepts the response payload transmission and modifies the map tile data in the response payload before relaying the modified response payload to the ECU 105. On receipt of the modified response payload (e.g., ostensibly containing updated map tile data for the road 703), the ECU 105 validates the response payload by extracting the SHA signature of the response payload from the HMAC digest using its locally stored nonce. The ECU compares the is extracted SHA signature against another version of the SHA signature generated for the response payload as received. Because there has been tampering of the map tile data in the response payload, the two signatures do not match. As a result, the ECU 105 presents an alert message 705 via a navigation system 707 of the vehicle 101 to indicate that "Invalid map data for the upcoming road has been received" and instructs the driver of the vehicle 101 to "Please take manual control of the vehicle until valid map data is obtained." The ECU 105 can then initiate another request for the map tile data and repeat the process until a valid response is received from the data platform 111.

Returning to FIG. 1, as shown, the system 100 includes the vehicle 101 equipped with a processor/ECU 105 with connectivity to the data platform 111 capable of providing or using a homomorphic cryptosystem according to the embodiments described herein. In one embodiment, the vehicle 101 capable or operating at one or more autonomous driving levels. The autonomous levels may be defined by the vehicle manufacturer, a regional, national, or international public entity, or a combination thereof. By way of example, the Society of Automotive Engineers (SAE) International published "Levels of Driving Automation" standard that defines the six levels of driving automation, from no automation to full automation. At Level 0: Automated system issues warnings and may momentarily intervene but has no sustained vehicle control. At Level 1 ("hands on"): The driver and the automated system share control of the vehicle. At Level 2 ("hands off"): The automated system takes full control of the vehicle (accelerating, braking, and steering). The driver must monitor the driving and be prepared to intervene immediately at any time if the automated system fails to respond properly. At Level 3 ("eyes off"): The driver can safely turn their attention away from the driving tasks, e.g. the driver can text or watch a movie. At Level 4 ("mind off"): no driver attention is ever required for safety, e.g. the driver may safely go to sleep or leave the driver's seat. At Level 5 ("steering wheel optional"): No human intervention is required at all.

In one embodiment, the data platform 111, vehicle 101, processor/ECU 105, user device 107, and/or other client devices also have connectivity or access to the geographic database 103 which stores representations of mapped geographic features to facilitate autonomous driving and/or other mapping/navigation-related applications or services. The geographic database 103 can cryptographic data according to the various embodiments of the homomorphic cryptosystem described herein.

In one embodiment, the data platform 111, vehicle 101, ECU 105, user device 107, etc. have connectivity over the communication network 113 to the services platform 115 that provides one or more services 117 related to vehicle map data update and/or other data services. By way of example, the services 117 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the data platform 111, services platform 115, and/or other components of the system 100 may be platforms with multiple interconnected components. The data platform 111, services platform 115, etc. may include multiple servers, intelligent networking devices, computing devices, components and corresponding software for providing a homomorphic cryptosystem. In addition, it is noted that the data platform 111 may be a separate entity of the system 100, a part of the one or more services 117, a part of the services platform 115, or other component of the system 100.

In one embodiment, content providers 119 may also provide content or data using embodiments of the homomorphic cryptosystem described herein. The content provided may be any type of content, such as map content, textual content, audio content, video content, image content, etc. In one embodiment, the content providers 119 may provide content that may aid in the providing or using a homomorphic cryptosystem. In one embodiment, the content providers 119 may also store content associated with the geographic database 103, data platform 111, ECU 105, user device 107, and/or vehicle 101. In another embodiment, the content providers 119 may manage access to a central repository of data, and offer a consistent, standard interface to data, such as a repository of the geographic database 103.

In one embodiment, the vehicle 101, ECU 105, user device 107, or other client devices may execute a software application 109 to provide or use a homomorphic cryptosystem according the embodiments described herein. By way of example, the application 109 may also be any type of application that is executable on the vehicle 101, ECU 105, user device 107, etc. such as but not limited to autonomous driving applications, mapping applications, location-based service applications, navigation applications, content provisioning services, camera/imaging application, media player applications, social networking applications, calendar applications, and the like. In one embodiment, the application 109 may act as a client for the data platform 111, services platform 115, and/or services 117 and perform one or more functions associated with providing a homomorphic cryptosystem.

By way of example, the ECU 105, user device 107, and/or other client device is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client devices can support any type of interface to the user (such as "wearable" circuitry, etc.). In one embodiment, the ECU 105, user device 107, and/or other client devices may be associated with the vehicle 101 or be a component part of the vehicle 101.

In one embodiment, the vehicle 101, user device 107, and/or other client devices are configured with various sensors for generating or collecting environmental sensor data (e.g., for processing by the in-vehicle processor/ECU 105 and/or data platform 111), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the client devices may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 101, ECU 105, user device 107, etc. may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 101, user device 107, etc. may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the data platform 111, services platform 115, services 117, vehicle 101, ECU 105, user device 107, and/or content providers 119 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
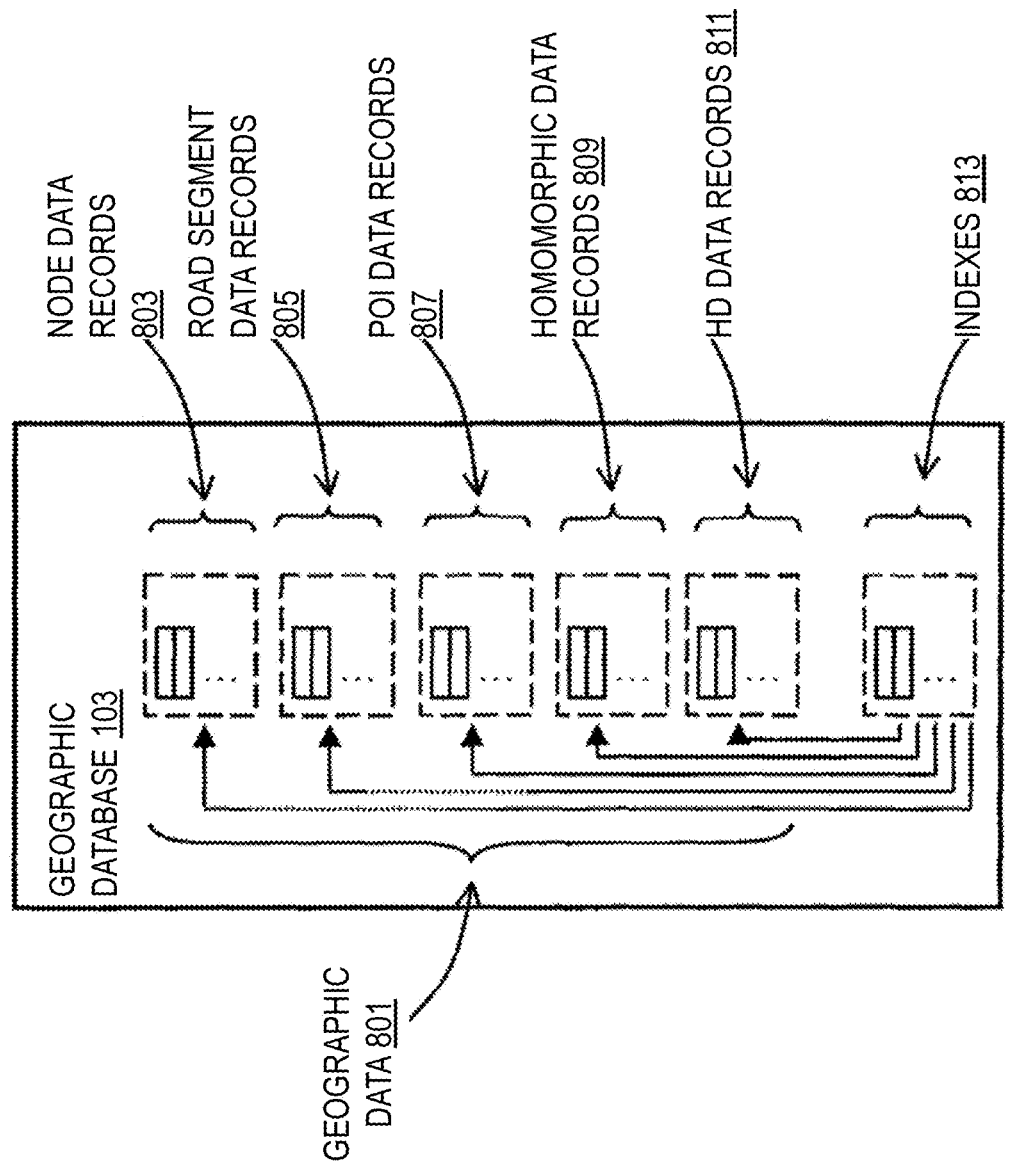
FIG. 8 is a diagram of a geographic database, according to one embodiment.

FIG. 8 is a diagram of a geographic database 103, according to one embodiment. In one embodiment, the geographic database 103 includes geographic data 801 used for (or configured to be compiled to be used for) mapping and/or navigation-related services. In one embodiment, the geographic database 103 include high resolution or high definition (HD) mapping data that provide centimeter-level or better accuracy of map features. For example, the geographic database 103 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road, and to determine map data updates (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 103 is stored as a hierarchical or multi-level tile-based projection or structure. More specifically, in one embodiment, the geographic database 103 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 103 includes node data records 803, road segment or link data records 805, POI data records 807, homomorphic data records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 103. In one embodiment, the indexes 813 may be used to quickly locate data without having to search every row in the geographic database 103 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 807. The geographic database 103 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 103 can also include homomorphic data records 809 for storing data related to the providing or using a homomorphic cryptosystem according to the embodiments described herein. For example, the homomorphic data records 809 can store encryption keys, nonces, ciphers, cryptographic signatures, authentication codes, and/or the like. In one embodiment, the homomorphic data records 809 can be associated with one or more of the node records 803, road segment records 805, and/or POI data records 807 to support uses cases such as enhanced mapping UIs, autonomous driving, dynamic map updates, etc. In one embodiment, the homomorphic data records 809 are stored as a data layer of the hierarchical tile-based structure of the geographic database 103 according to the various embodiments described herein.

In one embodiment, as discussed above, the HD mapping data records 811 model road surfaces and other map features to centimeter-level or better accuracy. The HD mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 811 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 103 can be maintained by the content provider 119 in association with the services platform 115 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle (e.g., vehicle 101 and/or user device 107) along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 101 or user device 107. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a homomorphic cryptosystem may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 9 illustrates a computer system 900 upon which an embodiment of the invention may be implemented. Computer system 900 is programmed (e.g., via computer program code or instructions) to provide a homomorphic cryptosystem as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing a homomorphic cryptosystem. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing a homomorphic cryptosystem. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing a homomorphic cryptosystem, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general, the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 113 for providing a homomorphic cryptosystem.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 (e.g., processor/ECU 105) upon which an embodiment of the invention may be implemented. Chip set 1000 is programmed to provide a homomorphic cryptosystem as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide a homomorphic cryptosystem. The memory 1005 also stores the data associated with or generated by the execution of the inventive steps.

FIG. 11 is a diagram of exemplary components of a mobile terminal 1101 (e.g., a user device 107 or component of the vehicle 101) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide a homomorphic cryptosystem. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    generating a nonce at a first device;
    performing a homomorphic operation on the nonce and a ciphertext to generate a resulting ciphertext, wherein the ciphertext is provided by a second device;
    attaching the resulting ciphertext to a request payload;
    transmitting the request payload including the nonce to the second device; and
    receiving a response payload from the second device.

2. The method of claim 1, wherein the ciphertext is received from the second device prior to generating the resulting cipher, and wherein no encryption key that was used to generate the ciphertext is transmitted to the first device.

3. The method of claim 1, wherein the response payload includes a message authentication code generated based at least in part on the nonce further comprising:
    validating the response payload based on the message authentication code.

4. The method of claim 3, wherein the message authentication code is a hash-based message authentication code generated using the nonce and a cryptographic signature of response data; and wherein the response payload includes the hash-based message authentication code and a clear-text version of the cryptographic signature.

5. The method of claim 4, further comprising:
    extracting the cryptographic signature from the hash-based message authentication code using the nonce stored locally at the first device, wherein the response payload is validated by comparing the extracted cryptographic signature to the clear-text version of the cryptographic signature.

6. The method of claim 1, wherein the nonce is specific to the request payload.

7. The method of claim 1, wherein the nonce is rotated according to a schedule.

8. The method of claim 1, wherein the ciphertext is individual to the first device.

9. The method of claim 1, wherein the first device is a processor of a vehicle and wherein the second device is a server of a data provider for the vehicle.

10. The method of claim 9, wherein the data provider is a mapping data provider and wherein the request payload includes a request for map data.

11. An apparatus comprising:
at least one processor; and
at least one memory including computer program code for one or more programs,
the at least one memory and the computer program code configured to, with the at least one processor, cause the apparatus to perform at least the following,
receive a request payload from a device, wherein the request payload includes a request ciphertext, and wherein the request ciphertext is generated by the device by performing a homomorphic operation on a nonce locally stored on the device and a ciphertext transmitted by the apparatus;
extracting the nonce from the request ciphertext using an inverse of the homomorphic operation;
attaching the resulting ciphertext to a response payload;
transmitting the request response payload including the nonce to the device; and
generate a message authentication code based at least in part on the nonce, wherein the derivative of the nonce includes the message authentication code.

12. The apparatus of claim 11, wherein the message authentication code is hash-based message authentication code generated using the nonce and a cryptographic signature of response data.

13. The apparatus of claim 12, wherein the response payload further includes another version of the cryptographic signature.

14. The apparatus of claim 13, wherein the another version is a clear-text version of the cryptographic signature.

15. A non-transitory computer-readable storage medium carrying one or more sequences of one or more instructions which, when executed by one or more processors, cause an apparatus to at least perform the following steps:
receiving a request to initiate a secret handshake with a device;
in response to the request, encrypting a seed using a homomorphic encryption system to generate a ciphertext; and
transmitting the ciphertext to the device,
wherein the ciphertext is used in combination with a nonce generated by the device to attach to a request payload from the device for receiving a response payload, wherein the response payload includes a message authentication code generated based at least in part on the nonce for validation of the response payload.

16. The non-transitory computer-readable storage medium of claim 15, wherein the encrypting of the seed is performed using a key-based encryption system, and wherein no key of the key-based encryption system is transmitted to the device.

17. The non-transitory computer-readable storage medium of claim 15, wherein the homomorphic encryption system is an unpadded Rivest-Shamir-Adleman (RSA) encryption system.

18. The non-transitory computer-readable storage medium of claim 15, wherein the seed is a random seed.

19. The non-transitory computer-readable storage medium of claim 15, wherein the device is an engine control unit (ECU) of a vehicle.

20. The non-transitory computer-readable storage medium of claim 15, wherein the message authentication code is a hash-based message authentication code generated using the nonce and a cryptographic signature of response data.

* * * * *